United States Patent
Ou

(10) Patent No.: US 10,064,517 B2
(45) Date of Patent: Sep. 4, 2018

(54) COFFEE MAKER

(71) Applicant: Roger Ou, Tainan (TW)

(72) Inventor: Roger Ou, Tainan (TW)

( * ) Notice: Subject to any disclaimer, the term of this patent is extended or adjusted under 35 U.S.C. 154(b) by 336 days.

(21) Appl. No.: 15/142,489

(22) Filed: Apr. 29, 2016

(65) Prior Publication Data

US 2017/0311751 A1 Nov. 2, 2017

(51) Int. Cl.
A47J 31/46 (2006.01)
A47J 31/60 (2006.01)
A47J 31/44 (2006.01)
H02J 7/00 (2006.01)

(52) U.S. Cl.
CPC ......... *A47J 31/465* (2013.01); *A47J 31/4403* (2013.01); *A47J 31/605* (2013.01); *H02J 7/0052* (2013.01); *H02J 2007/0062* (2013.01)

(58) Field of Classification Search
CPC .... A47J 31/4403; A47J 31/465; A47J 31/605; H02J 2007/0062; H02J 2007/0052
USPC .......... 99/285, 287, 299, 300, 315; 426/431
See application file for complete search history.

(56) References Cited

U.S. PATENT DOCUMENTS

| | | | | |
|---|---|---|---|---|
| 3,063,359 A * | 11/1962 | Brant | ...................... | A47J 31/02 99/287 |
| 4,662,271 A * | 5/1987 | Woltermann | ....... | A47J 31/0573 141/18 |
| 4,779,520 A * | 10/1988 | Hauslein | ............. | A47J 31/0631 99/287 |
| 2006/0157463 A1* | 7/2006 | Wiele | ...................... | A47J 31/40 219/214 |
| 2007/0051248 A1* | 3/2007 | Lee | ........................ | A23G 9/045 99/281 |
| 2008/0202346 A1* | 8/2008 | Accumanno | ............ | A47J 31/02 99/280 |
| 2009/0223374 A1* | 9/2009 | Morin | .................. | A47J 31/3619 99/287 |
| 2009/0317526 A1* | 12/2009 | Tacklind | ............. | A47J 31/0615 426/433 |
| 2011/0303094 A1* | 12/2011 | Lown | .................. | A47J 31/0605 99/299 |
| 2012/0183659 A1* | 7/2012 | Hulett | ..................... | A23F 5/262 426/431 |
| 2013/0186280 A1* | 7/2013 | Sekiguchi | ............. | A47J 31/005 99/287 |
| 2014/0076172 A1* | 3/2014 | Bowman | ................. | A47J 31/06 99/323 |

(Continued)

*Primary Examiner* — Dana Ross
*Assistant Examiner* — Joe E Mills, Jr.
(74) *Attorney, Agent, or Firm* — Rosenberg, Klein & Lee

(57) ABSTRACT

A coffee maker includes a base for supporting a coffee cup. A support arm is mounted on an upper surface of the base and extends perpendicularly to the base. The support arm includes a chamber. A holding tube extends outward from a top portion of the support arm. A reservoir securely is held by the holding tube and receives a liquid. A bracket extends outward from an intermediate portion of the support arm. A dissolution cup is supported by the bracket. A driver is mounted in the support arm and is configured to drive the reservoir to rotate. The liquid in the reservoir flow swirlingly into the dissolution cup to fully and evenly contact with surfaces of the coffee powder, thereby fully extracting the coffee powders. The liquid flows into the coffee cup after dissolving the coffee powder.

10 Claims, 3 Drawing Sheets

(56) References Cited

U.S. PATENT DOCUMENTS

| | | | |
|---|---|---|---|
| 2014/0083300 A1* | 3/2014 | Brunner | A47J 31/002 99/283 |
| 2014/0165845 A1* | 6/2014 | Issar | A47J 31/20 99/283 |
| 2014/0272047 A1* | 9/2014 | Rosati | A47J 31/4403 426/431 |
| 2014/0272062 A1* | 9/2014 | Hogan | A47J 43/042 426/519 |
| 2015/0305544 A1* | 10/2015 | Lancey | A47J 31/0621 426/431 |

* cited by examiner

COFFEE MAKER

BACKGROUND OF THE INVENTION

The present invention relates to a coffee maker and, more particularly, to a coffee maker providing a better coffee extracting effect.

A coffee maker is a device for brewing and extracting coffee powder. When a conventional coffee maker proceeds with brewing, an external liquid directly flows to the coffee powder. However, coffee cannot be uniformly extracted from the coffee powder.

BRIEF SUMMARY OF THE INVENTION

To overcome the disadvantage of the conventional technique, the present invention provides a coffee maker including a base adapted for supporting a coffee cup. A support arm is mounted on an upper surface of the base and extends perpendicularly to the base. The support arm includes a chamber. A holding tube extends outward from a top portion of the support arm. A reservoir is securely held by the holding tube. A bracket extends outward from an intermediate portion of the support arm. A dissolution cup is supported by the bracket. A driver is mounted in the support arm and is configured to drive the reservoir to rotate, making a liquid in the reservoir flow swirlingly into the dissolution cup to dissolve coffee powder in the dissolution cup and then flow into the coffee cup.

In operation, the reservoir is driven by the driver to rotate along the holding tube, and the liquid in the reservoir flows swirlingly into the dissolution cup. The liquid flowing swirlingly into the dissolution cup can fully and evenly contact with surfaces of the coffee powder to fully extract the coffee powders.

The driver can include a rotational ring mounted around the reservoir, a bearing mounted around the rotational ring for supporting the rotational ring, and a motor mounted in the chamber of the support arm. The rotational ring can be connected to a rotating shaft of the motor via a transmission belt.

The reservoir can include an eccentrically disposed first liquid outlet.

The coffee maker can further include an adjusting ring mounted around the reservoir for adjusting closing of the first liquid outlet.

The dissolution cup can include a bottom having a second liquid outlet.

The coffee maker can further include a mesh filter mounted between the dissolution cup and the coffee cup.

The coffee maker can further include a thermometer mounted in the reservoir.

The coffee maker can further include an anti-scalding sleeve mounted around the coffee cup.

The coffee maker can further include a battery mounted in the chamber of the support arm to power the driver.

The coffee maker can further include an USB interface mounted to a sidewall of the support arm. The USB interface is configured to charge the battery.

The present invention will become clearer in light of the following detailed description of illustrative embodiments of this invention described in connection with the drawings.

DETAILED DESCRIPTION OF THE INVENTION

Figure 1:
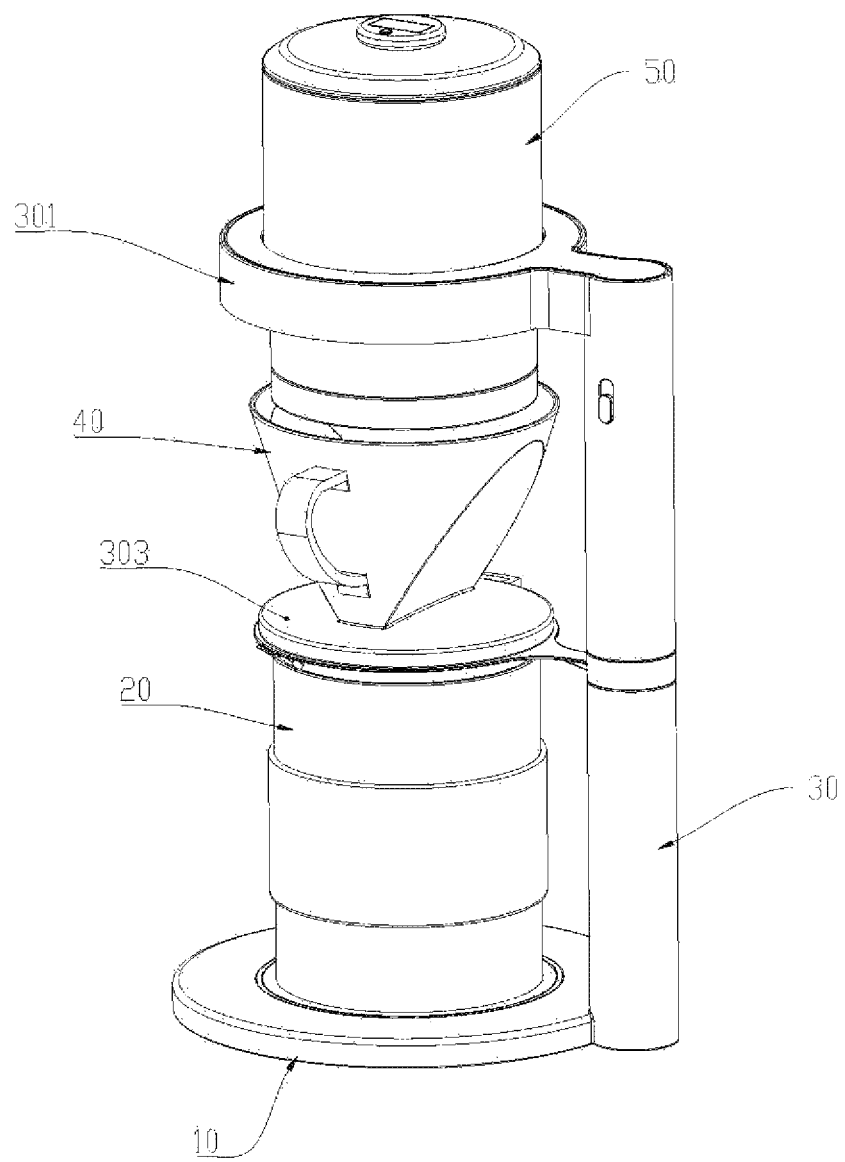
FIG. 1 is a perspective view of a coffee maker according to the present invention.
Figure 2:
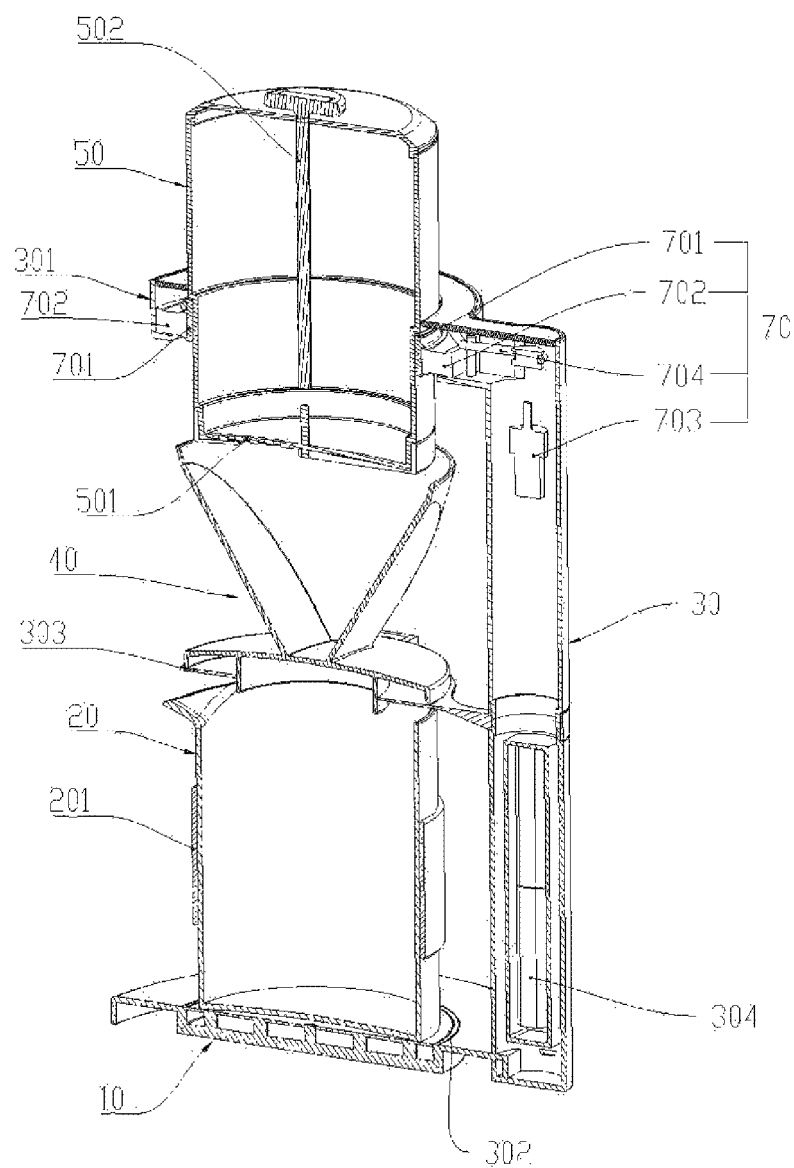
FIG. 2 is a partly-cutaway perspective view of the coffee maker according to the present invention.
Figure 3:
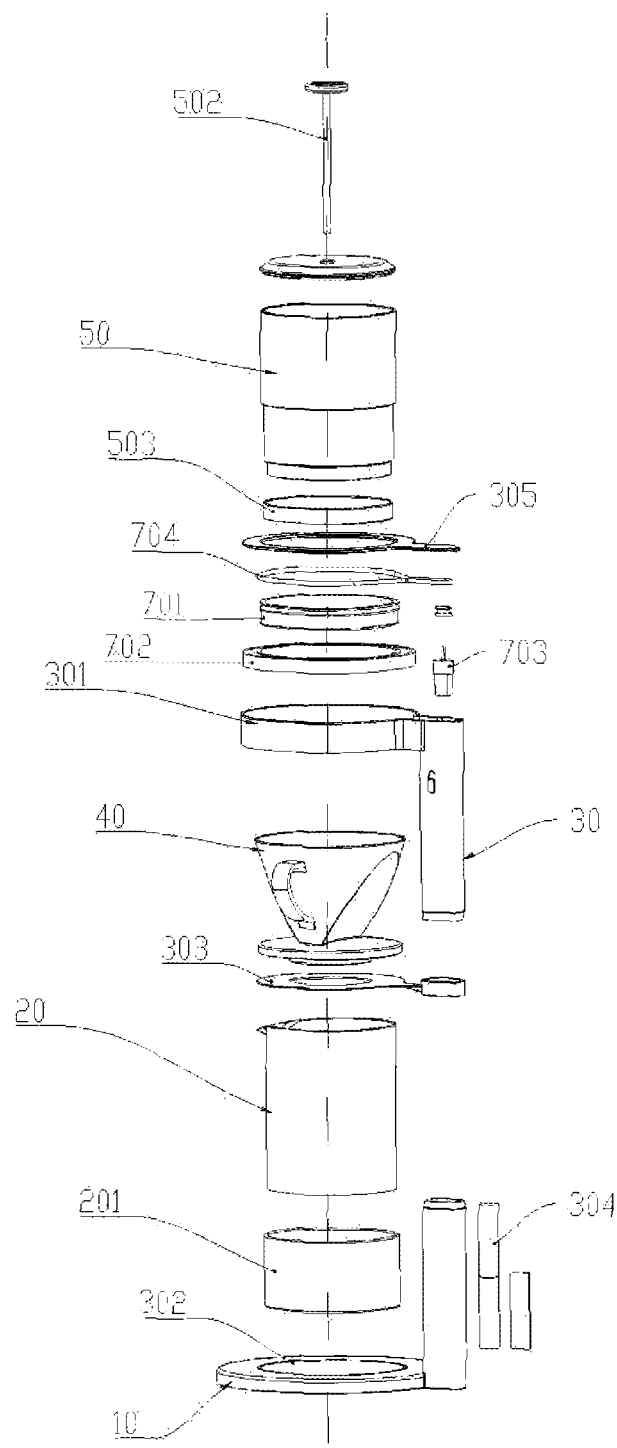
FIG. 3 is an exploded, perspective view of the coffee maker according to the present invention.

With reference to FIGS. 1-3, a coffee maker includes a base 10 adapted for supporting a coffee cup 20. A support arm 30 is mounted on an upper surface of the base 10 and extends perpendicularly to the base 10. The support arm 30 includes a chamber. A holding tube 301 extends outward from a top portion of the support arm 30 for securely holding a reservoir 50. A bracket 303 extends outward from an intermediate portion of the support arm 30 for supporting a dissolution cup 40.

The reservoir 50 can receive a liquid and includes a bottom having a first liquid outlet 501. The dissolution cup 40 can receive coffee powder. The coffee cup 20 can receive solution after brewing and extraction. The support arm 30 supports the reservoir 50 and the dissolution cup 40. The reservoir 50, the dissolution cup 40, and the coffee cup 20 are located, from above to below, on the same vertical plane.

A driver 70 is mounted in the support arm 30 and is configured to drive the reservoir 50 to rotate. When the driver 70 drives the reservoir 50 to rotate, the liquid in the reservoir 50 flows swirlingly into the dissolution cup 40 to dissolve the coffee powder in the dissolution cup 40 and then flows into the coffee cup 20.

Specifically, as shown in FIGS. 2 and 3, the driver 70 includes a rotational ring 701 mounted around the reservoir 50, a bearing 702 mounted around the rotational ring 701 for supporting the rotational ring 701, and a motor 703 mounted in the chamber of the support arm 30. The rotational ring 701 is connected to a rotating shaft of the motor 703 via a transmission belt 704.

In this embodiment, a cover 305 is fixed to a top of the holding tube 301 and has a hollow structure. The reservoir 50 extends through the cover 305 and is held in the holding tube 301. A fixing ring 302 can be mounted on the upper face of the base 10 for fixing the coffee cup 20.

The reservoir 50 can include a plurality of eccentrically disposed first liquid outlets 501. An adjusting ring 503 is mounted around the reservoir 50 for adjusting closing of the first liquid outlets 501. The amount of liquid entering the dissolution cup 40 can be adjusted by adjusting closing of the first liquid outlets 501, thereby controlling the time of brewing and extraction of the coffee powder by the liquid.

The dissolution cup 40 includes a bottom having a second liquid outlet (not labeled). A mesh filter (not labeled) is mounted between the dissolution cup 40 and the coffee cup 20. A thermometer 502 is mounted in the reservoir 50. An anti-scalding sleeve 201 is mounted around the coffee cup 20. A battery 304 is mounted in the chamber of the support arm 30 for empowering the driver 70. A charging interface is mounted to a sidewall of the support arm 30 and is electrically connected to the battery 304. The charging interface is an USB interface.

Coffee powder is placed into the dissolution cup 40 and the reservoir 50 receiving a liquid is placed in the holding tube 301. The liquid is water. In operation, the motor 703 is activated to drive the rotational ring 701 to rotate. The reservoir 50 rotates together with the rotational ring 701. The liquid in the reservoir 50 flows swirlingly into the dissolution cup 40 via the first liquid outlets 501. The liquid brews and extracts the coffee powder. After brewing and extraction, the liquid flows into the coffee cup 20. To avoid solid particles from entering the coffee cup 20, a mesh filter is mounted to the bottom of the dissolution cup 40. To detect the temperature of the liquid in the reservoir 50, a thermometer 502 is mounted in the reservoir 50.

Although specific embodiments have been illustrated and described, numerous modifications and variations are still possible without departing from the scope of the invention. The scope of the invention is limited by the accompanying claims.

What is claimed is:

1. A coffee maker comprising:
a base adapted for supporting a coffee cup;
a support arm mounted on an upper surface of the base and extending perpendicularly to the base, with the support arm including a chamber, with a holding tube extending outward from a top portion of the support arm, with a reservoir securely held by the holding tube, with a bracket extending outward from an intermediate portion of the support arm, and with a dissolution cup supported by the bracket; and
a driver mounted in the support arm, with the driver configured to drive the reservoir to rotate, making a liquid in the reservoir flow swirlingly into the dissolution cup to dissolve coffee powder in the dissolution cup and then flow into the coffee cup.

2. The coffee maker as claimed in claim 1, wherein the driver includes a rotational ring mounted around the reservoir, a bearing mounted around the rotational ring for supporting the rotational ring, and a motor mounted in the chamber of the support arm, and the rotational ring is connected to a rotating shaft of the motor via a transmission belt.

3. The coffee maker as claimed in claim 1, wherein the reservoir includes an eccentrically disposed first liquid outlet.

4. The coffee maker as claimed in claim 3, further comprising an adjusting ring mounted around the reservoir, with the adjusting ring adjusting closing of the first liquid outlet.

5. The coffee maker as claimed in claim 1, wherein the dissolution cup includes a bottom having a second liquid outlet.

6. The coffee maker as claimed in claim 1, further comprising a mesh filter mounted between the dissolution cup and the coffee cup.

7. The coffee maker as claimed in claim 1, further comprising a thermometer mounted in the reservoir.

8. The coffee maker as claimed in claim 1, further comprising an anti-scalding sleeve mounted around the coffee cup.

9. The coffee maker as claimed in claim 1, further comprising a battery mounted in the chamber of the support arm, with the battery powering the driver.

10. The coffee maker as claimed in claim 9, further comprising an USB interface mounted to a sidewall of the support arm, with the USB interface configured to charge the battery.

* * * * *